Nov. 11, 1924.
B. F. ROCKHILL
1,515,414
VALVE MECHANISM
Filed May 2, 1923
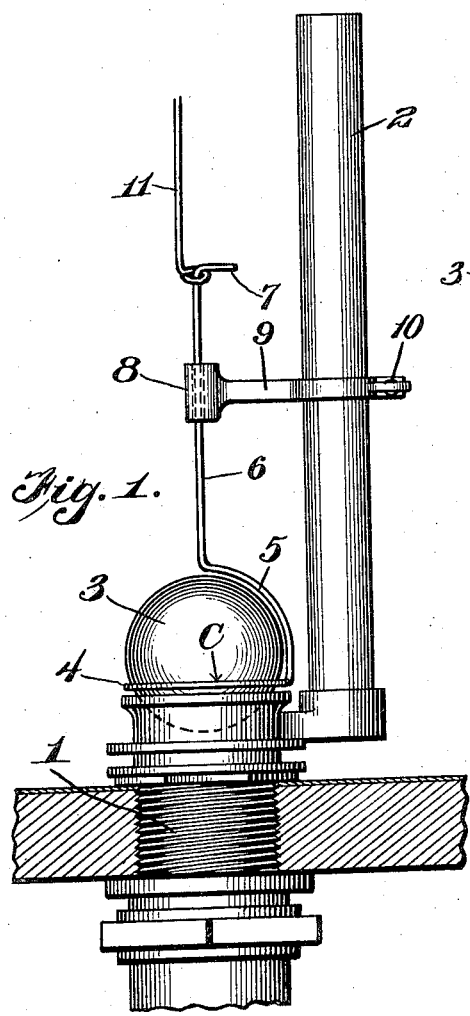
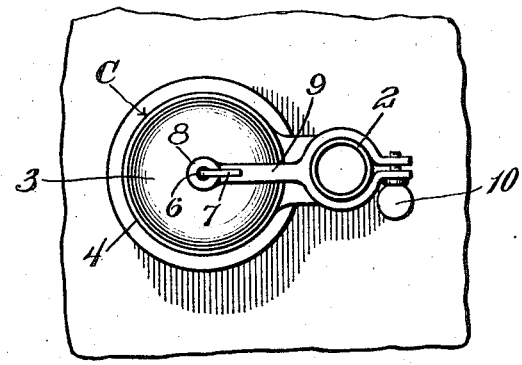
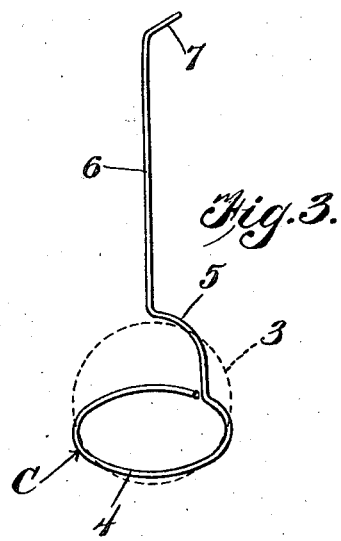
Inventor
Benjamin F. Rockhill
Watson E. Coleman
Atty Patented Nov. 11, 1924.

1,515,414

UNITED STATES PATENT OFFICE.

BENJAMIN FRANKLIN ROCKHILL, OF COLUMBUS, NEW JERSEY.

VALVE MECHANISM.

Application filed May 2, 1923. Serial No. 636,213.

*To all whom it may concern:*

Be it known that I, BENJAMIN FRANKLIN ROCKHILL, a citizen of the United States, residing at Columbus, in the county of Burlington and State of New Jersey, have invented certain new and useful Improvements in Valve Mechanisms, of which the following is a specification, reference being had to the accompanying drawings.

This invention relates to certain improvements in valve mechanisms and has relation more particularly to a valve for a flush tank and it is an object of the invention to provide a novel and improved structure of this general character comprising a self-adjusting ball valve and having associated therewith a cage whereby it is assured that the ball valve will always roll to a perfect seat.

The invention consists in the details of construction and in the combination and arrangement of the several parts of my improved valve mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation illustrating a valve mechanism constructed in accordance with an embodiment of my invention;

Figure 2 is a view in top plan of the structure as illustrated in Figure 1; and

Figure 3 is a view in perspective of the cage unapplied, the associated ball valve being indicated by broken lines.

As disclosed in the accompanying drawings, 1 denotes the upper or inserted end portion of a discharge pipe for a flush tank and which has in communication therewith a vertically disposed overflow pipe 2 of a conventional type.

Coacting with the discharge pipe 1 is a ball valve 3 constructed in any desired manner and which has its lower portion disposed through an annular member 4 comprised in the cage C. The mean diameter of the annular member 4 is less than the major diameter of the ball valve 3 yet such mean diameter of the member 4 is sufficient to assure the proper seating of the ball valve 3 relative to the discharge pipe 1.

As herein disclosed the cage C is formed by a single strand of material, preferably brass spring wire, of requisite gauge. One end portion of the strand is bent to form the annular member 4, said annular member 4 is split and one end portion is continued by the upwardly and rearwardly curved arm 5 which closely approaches the applied ball valve 3. The ball valve 3 is disposed inwardly of the annular member 3 and terminates at substantially the axial center thereof and is then continued by a straight arm 6 disposed in a direction away from the member 4. The outer or free end portion of the arm 6 is continued by a laterally disposed extension 7.

The arm 6 is freely disposed through a sleeve 8 carried by one end portion of an arm 9, the opposite end portion of the arm 5 being provided with a clamping means, indicated as 10, which engages the overflow pipe 2 whereby the cage C and the ball valve 3 associated therewith may freely move toward or from the discharge pipe 1 whereby the ball valve 3 is self-adjusting and readily rolls to a perfect seat.

As is clearly illustrated in the accompanying drawings, the curved arm 5 closely approaches the periphery of the ball valve 3 whereby said ball valve 3 is maintained against displacement with respect to the cage C, yet at the same time readily permitting the ball valve 3 to be placed from above in applied or working position upon the annular member 4. Any suitable means, as indicated at 11 is engaged with the upper end portion of the arm 6 or more particularly with the annular extension 7 thereof whereby the ball 3 may be raised or moved into open position with respect to the discharge pipe 1.

From the foregoing description it is thought to be obvious that a valve mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

The combination with a valve seat, and a ball valve therefor; of a cage for the ball valve including an annular member through which the ball valve partially extends from above, an arm carried by the annular member and overlying the ball valve and terminating at substantially the axial center of the ball valve, and a second arm extending from the first named arm, said annular member and both of the arms being formed from a single length of material, the first named arm permitting free application of the ball valve upon the annular member and constituting the only means for holding the ball valve against displacement with respect to the annular member.

In testimony whereof I hereunto affix my signature.

BENJAMIN FRANKLIN ROCKHILL.